(12) United States Patent
Fujioka et al.

(10) Patent No.: US 12,314,018 B2
(45) Date of Patent: May 27, 2025

(54) SETTING SUPPORT DEVICE

(71) Applicant: OMRON Corporation, Kyoto (JP)

(72) Inventors: Takumi Fujioka, Ritto (JP); Mamoru Egi, Otsu (JP)

(73) Assignee: OMRON Corporarion, Kyoto (JP)

( * ) Notice: Subject to any disclaimer, the term of this patent is extended or adjusted under 35 U.S.C. 154(b) by 288 days.

(21) Appl. No.: 17/261,545

(22) PCT Filed: Aug. 7, 2019

(86) PCT No.: PCT/JP2019/031248
§ 371 (c)(1),
(2) Date: Jan. 19, 2021

(87) PCT Pub. No.: WO2020/039946
PCT Pub. Date: Feb. 27, 2020

(65) Prior Publication Data
US 2021/0294280 A1    Sep. 23, 2021

(30) Foreign Application Priority Data

Aug. 21, 2018    (JP) ................. 2018-155019

(51) Int. Cl.
*G05B 13/04*    (2006.01)
*B25J 9/16*    (2006.01)
(Continued)

(52) U.S. Cl.
CPC .......... *G05B 13/042* (2013.01); *B25J 9/1638* (2013.01); *H02P 29/00* (2013.01); *G05B 19/404* (2013.01);
(Continued)

(58) Field of Classification Search
CPC ................ G05B 13/042; G05B 19/404; G05B 2219/39215; G05B 2219/42267; B25J 9/1638; H02P 29/00; H02P 6/34
(Continued)

(56) References Cited

U.S. PATENT DOCUMENTS 9,971,317 B2 * 5/2018 Maturana ............. G05B 13/042
2003/0195641 A1 * 10/2003 Wojsznis ............... G05B 11/42
700/42

FOREIGN PATENT DOCUMENTS

CN        107193217      9/2017
EP        2980986        2/2016
(Continued)

OTHER PUBLICATIONS

Munoz-Silva, Arturo, Gustavo Rodriguez-Gomez, and Jose Martinez-Carranza. "Hovering Controller for a Quadrotor Using Stochastic Test Signals." (AMCA, 2017) Congreso Nacional de Control Automático 2017. Retrieved Online. <https://amca.mx/memorias/amca2017/media/files/0119.pdf> (Year: 2017).*

(Continued)

*Primary Examiner* — John E Johansen
(74) *Attorney, Agent, or Firm* — JCIPRNET

(57) ABSTRACT

A setting support device according to the present invention is provided with: a first identification means that identifies an evaluation index value indicating the stability or control performance of motor control by a motor control device in each of a plurality of load device states in which a load device is in mutually different orientations or situations; a second identification means that identifies a combined evaluation index value representative of the evaluation index values for the plurality of load device states, identified by the first identification means, on the basis of the evaluation index values for the plurality of load device states; and a display control means that displays, on a screen of a display, (Continued)

the combined evaluation index value identified by the second identification means.

10 Claims, 11 Drawing Sheets

(51) Int. Cl.
- *H02P 29/00* (2016.01)
- *G05B 19/404* (2006.01)
- *H02P 6/34* (2016.01)

(52) U.S. Cl.
CPC .............. *G05B 2219/39215* (2013.01); *G05B 2219/42267* (2013.01); *H02P 6/34* (2016.02)

(58) Field of Classification Search
USPC ........................................................ 700/275
See application file for complete search history.

(56) References Cited

FOREIGN PATENT DOCUMENTS

| | | | | |
|---|---|---|---|---|
| EP | 2980986 | B1 * | 12/2019 | .............. H02P 23/14 |
| JP | 2007034781 | | 2/2007 | |
| JP | 2015156194 | | 8/2015 | |
| JP | 2017167607 | | 9/2017 | |
| WO | 2009096169 | | 8/2009 | |
| WO | 2014167851 | | 10/2014 | |
| WO | 2016170661 | | 10/2016 | |

OTHER PUBLICATIONS

Kiong, Tan Kok, Wang Qing-Guo, Hang Chang Chieh, and Tore J. Hagglund. Advances in PID control. (Springer-Verlag, 1999). pp. 35-61. ISBN-13:978-1-4471-1219-8 (Year: 1999).*

Mahamood, Rasheedat M., and Jimoh O. Pedro. "Hybrid PD/PID controller design for two-link flexible manipulators." In 2011 8th Asian Control Conference (ASCC), pp. 1358-1363. IEEE, 2011. (Year: 2011).*

Giuseppe, Carbone. "Stiffness Analysis for an Optimal Design of Multibody Robotic Systems." In Robot Manipulators New Achievements. IntechOpen, 2010. (Year: 2010).*

Rosa, Diego Gabriel Gomes, Marco Antonio Meggiolaro, and José Flávio Silveira Feiteira. "COBEM-2017-0859 Velocity and Posture Selection for Torque Optimization in Manipulators With Two-Dimensional Force Requirements." 24th ABCM International Congress of Mechanical Engineering (2017). (Year: 2017).*

Vargas, Antonio Matus, Gustavo Rodriguez Gómez, and José Martinez Carranza. "Quadrotor flight in constrained indoor environments." (INAOE, 2017). (Year: 2017).*

Feddema, John T. "Kinematically optimal robot placement for minimum time coordinated motion." In proceedings of IEEE international conference on robotics and automation, vol. 4, pp. 3395-3400. IEEE, 1996. (Year: 1996).*

Kim, Man Su, et. al. "Application of Gain Scheduling Technique to a 6-Axis Articulated Robot using LabVIEW®." In Proceedings of the International Conference on Scientific Computing (CSC), p. 1. Computer Engineering and Applied Computing (WorldComp), 2014. (Year: 2014).*

Mamat, Rosbi. "A new tuning method for two-degree-of-freedom internal model control under parametric uncertainty." Chinese Journal of Chemical Engineering 21, No. 9 (2013): 1030-1037. (Year: 2013).*

Moberg, Stig, and Jonas Öhr. "Robust control of a flexible manipulator arm: A benchmark problem." IFAC Proceedings vols. 38, No. 1 (2005): 137-142. (Year: 2005).*

Yurkovich, Steve, Anthony P. Tzes, Iewen Lee, and Kenneth L. Hillsley. "Control and system identification of a two-link flexible manipulator." In Proceedings., IEEE International Conference on Robotics and Automation, pp. 1626-1631. IEEE, 1990. (Year: 1990).*

Matinnejad, Reza, Shiva Nejati, Lionel Briand, Thomas Bruckmann, and Claude Poull. "Search-based automated testing of continuous controllers: Framework, tool support, and case studies." Information and Software Technology 57 (2015): 705-722. (Year: 2015).*

Robinett III, Rush D., John Feddema, G. Richard Eisler, Clark Dohrmann, Gordon G. Parker, David G. Wilson, and Dennis Stokes. Flexible robot dynamics and controls. vol. 19. Springer Science & Business Media, 2002 (Year: 2002).*

Lahti, Liisa. "Performance index for closed-loop controls." Master's thesis, (Tampere University of Technology, 2018). Available at <https://core.ac.uk/download/pdf/250162983.pdf> (Year: 2018).*

Alkhafaji, Falih SM, WZ Wan Hasan, M. M. Isa, and N. Sulaiman. "A novel method for tuning PID controller." Journal of Telecommunication, Electronic and Computer Engineering (JTEC) 10, No. 1-12 (2018): 33-38. (Year: 2018).*

Okubanjo, A. A., O. K. Oyetola, M. O. Osifeko, O. O. Olaluwoye, and P. O. Alao. "Modeling of 2-DOF robot arm and control." Futo J Series (FUTOJNLS) 3, No. 2 (2017): 80-92. publication at: <https://www.researchgate.net/publication/324531716> (Year: 2017).*

"Search Report of Europe Counterpart Application", issued on Apr. 8, 2022, p. 1-p. 9.

"International Search Report (Form PCT/ISA/210) of PCT/JP2019/031248", mailed on Nov. 5, 2019, with English translation thereof, pp. 1-4.

"Written Opinion of the International Searching Authority (Form PCT/ISA/237) of PCT/JP2019/031248", mailed on Nov. 5, 2019, with English translation thereof, pp. 1-6.

"Office Action of China Counterpart Application", issued on Jun. 28, 2024, with English translation thereof, pp. 1-24.

* cited by examiner

INFORMATION PRESENTED TO USER

SETTING SUPPORT DEVICE

CROSS-REFERENCE TO RELATED APPLICATION

This application is a 371 application of the International PCT application serial no. PCT/JP2019/031248, filed on Aug. 7, 2019, which claims the priority benefit of Japan Patent Application No. 2018-155019, filed on Aug. 21, 2018. The entirety of each of the above-mentioned patent applications is hereby incorporated by reference herein and made a part of this specification.

TECHNICAL FIELD

The present invention relates to a setting support device supporting setting of parameter values in a motor control device.

BACKGROUND ART

In a system such as a serial link robot, mechanical parameters (an inertia and the like) of a load device of each motor vary depending on an orientation of the load device. Therefore, various control parameter values for a motor control device of each motor inside such a system have to be values with which the motor can be suitably controlled regardless of the orientation of the load device. However, all the existing technologies (for example, refer to Patent Literature 1) for setting control parameters in a motor control device are established on the premise that mechanical parameters of a load device are constant. For this reason, when setting/adjusting various control parameters of a motor control device for controlling a motor that drives a load device in which mechanical parameters vary depending on an orientation, work such as "setting/adjusting control parameter value→evaluation→changing orientation of load device→evaluation" has to be repeated over and over.

Since a mechanical parameter of a load device may also vary depending on a situation (presence or absence, variation, or the like of a load mass) of the load device, there is a demand for a technology capable of reducing a time needed for setting a parameter value in a motor control device for a motor that drives a load device in which mechanical parameters vary depending on an orientation or a situation.

CITATION LIST

Patent Literature

Patent Literature 1

Japanese Patent Laid-Open No. 2017-167607

SUMMARY OF INVENTION

The present invention has been made in consideration of the foregoing problems, and an objective thereof is to provide a setting support device capable of reducing a time needed for setting a parameter value in a motor control device that controls a motor that drives a load device in which mechanical parameters vary depending on an orientation or a situation.

In order to achieve the foregoing objective, according to an aspect of the present invention, there is provided a setting support device supporting setting of a control parameter in a motor control device that controls a motor that drives a load device in which mechanical parameters vary depending on an orientation or a situation. The setting support device includes a first identification means that identifies an evaluation index value indicating a stability or control performance of motor control by the motor control device in each of a plurality of load device states in which the load device is in mutually different orientations or situations, a second identification means that identifies a combined evaluation index value representative of the evaluation index values for the plurality of load device states on the basis of the evaluation index values for the plurality of load device states identified by the first identification means, and a display control means that displays the combined evaluation index value identified by the second identification means on a screen of a display.

That is, this setting support device displays the combined evaluation index value representative of the evaluation index values for the plurality of load device states on the screen of the display. For this reason, a user of the setting support device can determine whether a current control parameter value of the motor control device is reasonable (causes no problem in all orientations/all situations of the load device) simply by looking at the combined evaluation index value. Therefore, according to this setting support device, it is possible to reduce a time needed for setting a parameter value in the motor control device that controls the motor that drives the load device in which the mechanical parameters vary depending on an orientation or a situation.

Regarding "a combined evaluation index value", "a worst value of the evaluation index values for the plurality of load device states" is generally used. However, evaluation index values for various orientations or situations that are not identification targets for the evaluation index value may be estimated from a relationship between the orientation or the situation and the evaluation index value, and an estimated result of a worst evaluation index value may be taken as the combined evaluation index value.

The setting support device may employ a configuration in which "the first identification means identifies the evaluation index value in each of the plurality of load device states for each of a plurality of control device states in which values of at least one control parameter of the motor control device are mutually different, the second identification means identifies the combined evaluation index value for each control device state, and the display control means displays each combined evaluation index value identified by the second identification means on the screen of the display in a form of being associated with information indicating the control device state in which each combined evaluation index value is identified". When this configuration (hereinafter, a first configuration) is employed in the setting support device, the display control means may display a graph illustrating a relationship between the value of the one control parameter in each control device state and the combined evaluation index value for each control device state on the screen of the display.

In addition, the first identification means may calculate each evaluation index value from an estimated result of a frequency response of a servo system including the motor control device or may calculate each evaluation index value from an actual measurement result of a frequency response of a servo system including the motor control device.

When the foregoing first configuration is employed in the setting support device, the setting support device may further be provided with a recommended value identification means that identifies a recommended value for at least the one control parameter on the basis of the combined evaluation index values for the plurality of load device states. Moreover, regarding the display control means, it is possible to employ a means that displays the recommended value identified by the recommended value identification means on the screen of the display.

In addition, the setting support device may employ a configuration in which "the first identification means identifies a first evaluation index value and a second evaluation index value indicating a stability or control performance of motor control by the motor control device in each of the plurality of load device states in which the load device is in mutually different orientations, the second identification means identifies a first combined evaluation index value representative of the first evaluation index values for the plurality of load device states and a second combined evaluation index value representative of the second evaluation index values for the plurality of load device states on the basis of the first evaluation index values and the second evaluation index values for the plurality of load device states calculated by the first identification means, and the display control means displays the first combined evaluation index value and the second combined evaluation index value on the screen of the display".

In the setting support device, the plurality of control device states may be in a state in which at least a combination of a value of a first control parameter and a value of a second control parameter are mutually different.

When the plurality of control device states is in the foregoing state, the setting support device may further be provided with a calculation means that calculates a value of one or more control parameters different from both the first control parameter and the second control parameter in each control device state from the value of the first control parameter or the value of the second control parameter in each control device state.

The first control parameter may be a speed proportional gain, and the second control parameter may be a position proportional gain. In addition, the setting support device may further have a recommended value output means that calculates an evaluation value E by the following calculation expression from a value $K_{pp}$ of the position proportional gain, a value $K_{vp}$ of the speed proportional gain, and constants $q_1$ and $q_2$ in the control device state thereof for each control device state in which the combined evaluation index value identified by the second identification means satisfies a first predetermined condition, and identifies and outputs the values $K_{pp}$ and $K_{vp}$, with which a largest evaluation value E is calculated, as the recommended value for the speed proportional gain and the recommended value for the position proportional gain.

$$E = q_1 K_{pp}^2 + q_2 K_{vp}^2 \qquad [\text{Math. 1}]$$

It is preferable that the evaluation index value be an index value for a stability. Therefore, it is preferable that the evaluation index value be a gain peak value of a positional closed loop or a speed closed loop or be a gain margin or a phase margin of a positional open loop or a speed open loop.

The setting support device may further be provided with a notch parameter recommended value output means that identifies an optimum value for a parameter of a notch filter inside the motor control device in each of the plurality of load device states; identifies, for each of the plurality of load device states, a third evaluation index value indicating a stability or control performance of motor control by the motor control device when a parameter value of the notch filter is the optimum value in each load device state; identifies, for each of the optimum values, a third combined evaluation index value representative of the third evaluation index values in which the optimum value is identified as a value of the parameter of the notch filter; and identifies and outputs a recommended value for the parameter of the notch filter on the basis of the third combined evaluation index value identified for each of the optimum values.

In addition, according to another aspect of the present invention, there is provided a setting support device supporting setting of a control parameter in a motor control device that controls a motor that drives a load device in which mechanical parameters vary depending on an orientation or a situation. The setting support device includes an identification means that identifies an evaluation index value indicating a stability or control performance of motor control by the motor control device in each of a plurality of load device states in which the load device is in mutually different orientations or situations, and a display control means that displays information indicating the evaluation index values for the plurality of load device states calculated by the identification means on a screen of a display.

That is, this setting support device (which will hereinafter be expressed as a second setting support device) displays information indicating the evaluation index values for the plurality of load device states on the screen of the display. For this reason, a user of the setting support device can determine whether a current control parameter value of the motor control device is reasonable (causes no problem in all orientations/all situations of the load device) from the information. Therefore, according to this setting support device, it is possible to reduce a time needed for setting a parameter value in the motor control device that controls the motor that drives the load device in which the mechanical parameters vary depending on an orientation or a situation.

In the second setting support device, "information indicating the evaluation index values for the plurality of load device states" may be in any form. For example, the second setting support device may employ a configuration in which "the identification means identifies the evaluation index value in each of the plurality of load device states for each of a plurality of control device states in which values of at least one control parameter of the motor control device are mutually different, and the display control means displays tabs for the combined evaluation index values identified for the plurality of control device states by the identification means for each of the load device states".

According to the present invention, it is possible to provide a setting support device capable of reducing a time needed for setting a parameter value in a motor control device that controls a motor that drives a load device in which mechanical parameters vary depending on an orientation or a situation.

DESCRIPTION OF EMBODIMENT

Hereinafter, an embodiment of the present invention will be described on the basis of the drawings.

Figure 1:
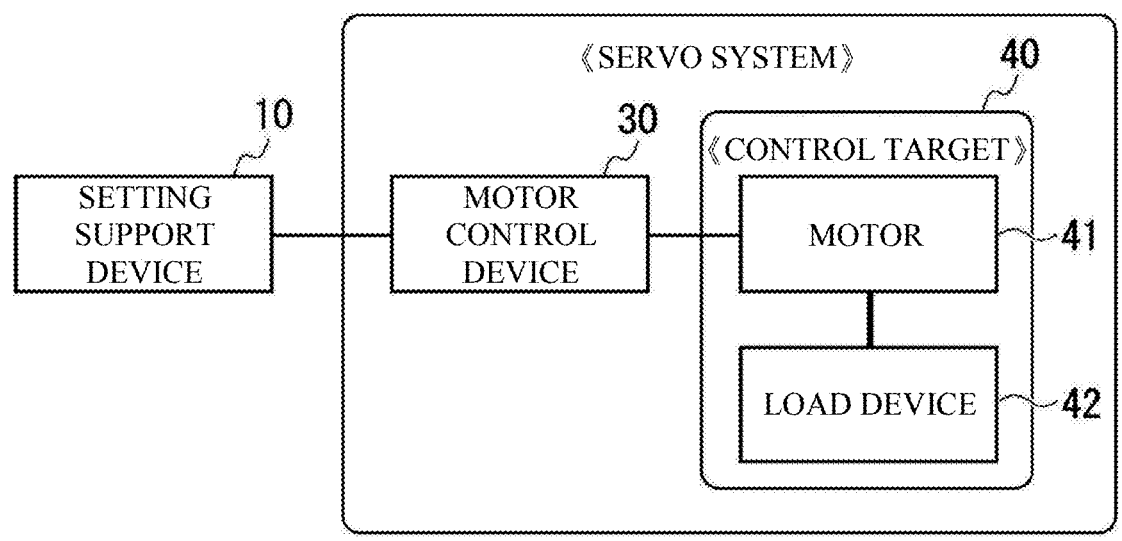
FIG. 1 is a view describing a form of using a setting support device 10 according to an embodiment of the present invention.

FIG. 1 illustrates an example of a form of using a setting support device 10 according to the embodiment of the present invention.

The setting support device 10 according to the present embodiment is a device for supporting setting of parameter values in a motor control device 30 that controls a motor 41 that drives a load device 42 in which mechanical parameters vary depending on an orientation or a situation.

The motor control device 30 is a device controlling the motor 41 in accordance with a command (a position command, a torque command, or a speed command) input from a superordinate device (not illustrated) such as a programmable logic controller (PLC). Hereinafter, a portion constituted of the motor 41 and the load device 42 will be expressed as a control target 40, and a portion constituted of the motor control device 30 and the control target 40 will be expressed as a servo system.

Figure 2:
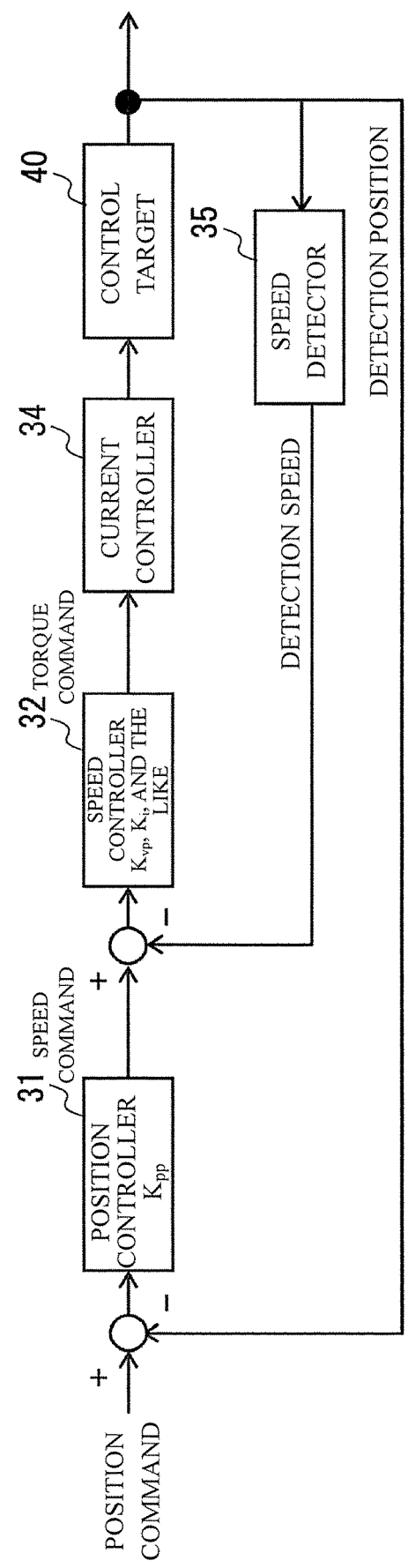
FIG. 2 is a block diagram for describing a control parameter of a motor control device.

When a position command is input from the superordinate device, as illustrated in FIG. 2, the motor control device 30 operates as a position controller 31, a speed controller 32, a current controller 34, a speed detector 35, or the like.

The speed detector 35 is a unit outputting a speed (hereinafter, a detection speed) of the control target 40 by differentiating a position (hereinafter, a detection position) of the control target 40 detected by an encoder (not illustrated) attached to the motor 41 or the load device 42.

The position controller 31 is a unit having a position proportional gain $K_{pp}$ as a control parameter. As illustrated in the diagram, a positional deviation that is a deviation between a position command and a detection position is input to this position controller 31. Further, the position controller 31 calculates and outputs a speed command that is a value obtained by multiplying the positional deviation by the position proportional gain $K_{pp}$.

The speed controller 32 is a unit performing PI control in which a speed deviation that is a deviation between a speed command and a detection speed is set as an operation amount and a torque command is set as a control amount. This speed controller 32 has a speed proportional gain $K_{vp}$ and an integration gain $K_i$ as control parameters.

In addition, the speed controller 32 includes a torque filter (low pass filter) and a notch filter capable of setting of turning on/off (whether or not to function). The torque filter inside the speed controller 32 has a cut-off frequency as a control parameter (which will hereinafter be expressed as a filter parameter), and the notch filter inside the speed controller 32 has a center frequency, a notch depth, and a Q value (=center frequency/notch width) as control parameters (which will hereinafter be expressed as filter parameters).

The current controller 34 is a unit generating a driving current according to a torque command from the speed controller 32 and supplying the driving current to a motor.

On the premise of those above, hereinafter, a configuration and operation of the setting support device 10 will be described specifically.

Figure 3:
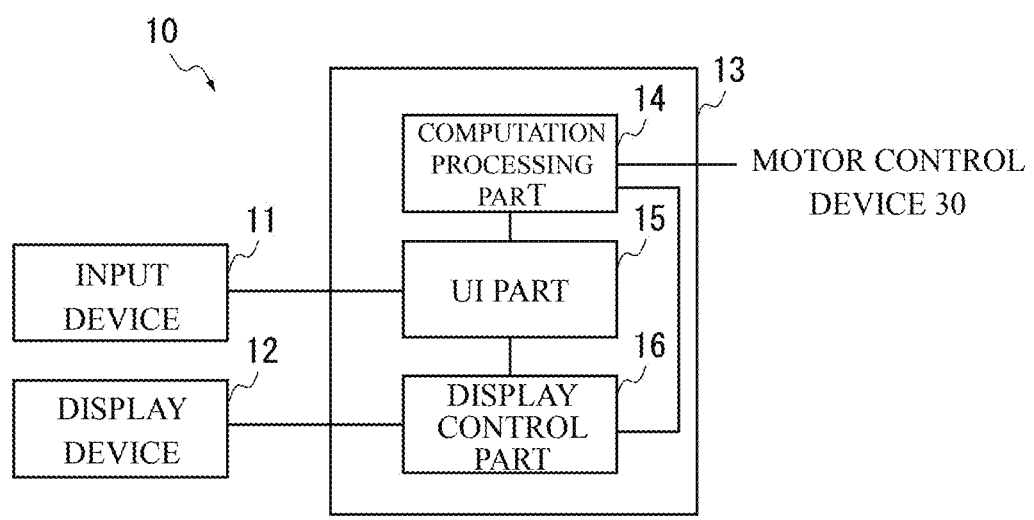
FIG. 3 is a functional block diagram of the setting support device 10.

FIG. 3 illustrates a functional block diagram of the setting support device 10.

The setting support device 10 according to the present embodiment is a device in which a setting support program is installed in a personal computer (PC). As illustrated in FIG. 3, the setting support program installed in the PC causes a main body portion (a portion constituted of a CPU and peripheral devices thereto) 13 of the PC to be operated as a computation processing part 14, a UI part 15, and a display control part 16.

The display control part 16 is a functional block displaying an image of details instructed from the computation processing part 14 or the UI part 15 on a screen of a display device 12. The UI part 15 is a functional block allowing a user to designate a kind and processing conditions of processing executed by the computation processing part 14 by operating an input device 11 such as a mouse and a keyboard, and causing the computation processing part 14 to execute processing of the kind designated by the user under the processing conditions designated by the user.

The computation processing part 14 is a functional block capable of executing first setting support processing, second setting support processing, notch parameter setting support processing, and the like.

Figure 4A:
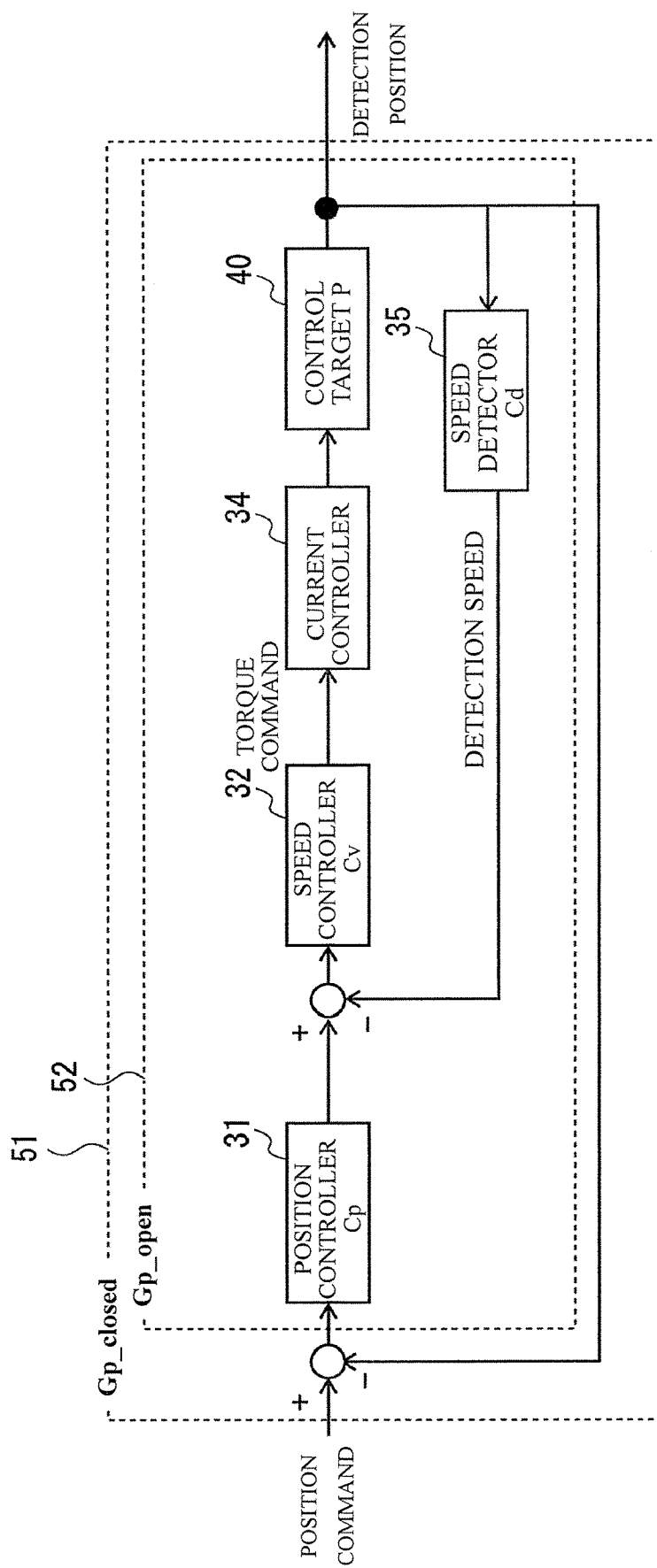
FIG. 4A is a view describing a positional closed loop characteristic Gp_closed and a positional open loop characteristic Gp_open.
Figure 4B:
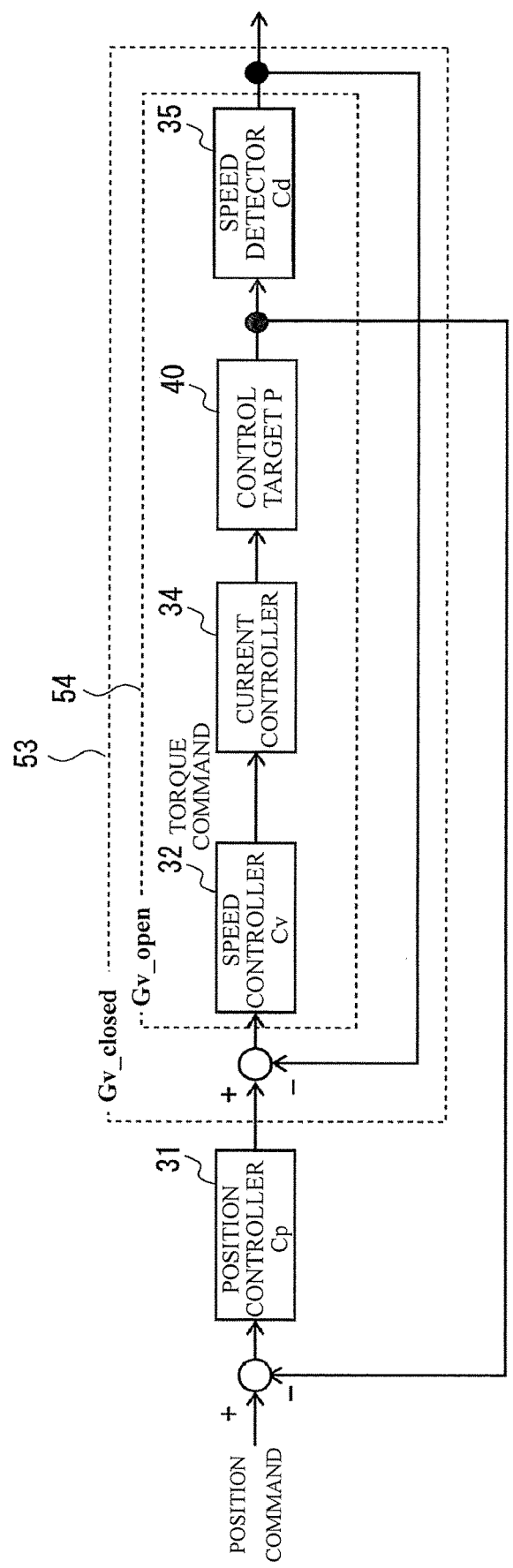
FIG. 4B is a view describing a speed closed loop characteristic Gv_closed and a speed open loop characteristic Gv_open.

Hereinafter, each step of the processing will be described in order. In the following description for each step of the processing, an orientation or a situation of the load device 42 will be simply expressed as an orientation of the load device 42. In addition, in the following description, a positional closed loop characteristic Gp_closed and a positional open loop characteristic Gp_open respectively denote frequency transfer functions of portions of the servo system indicated within dotted line frames 51 and 52 in FIG. 4A. In addition, a speed closed loop characteristic Gv_closed and a speed open loop characteristic Gv_open respectively denote frequency transfer functions of portions of the servo system indicated within dotted line frames 53 and 54 in FIG. 4B.

<<First Setting Support Processing>>

Figure 5:
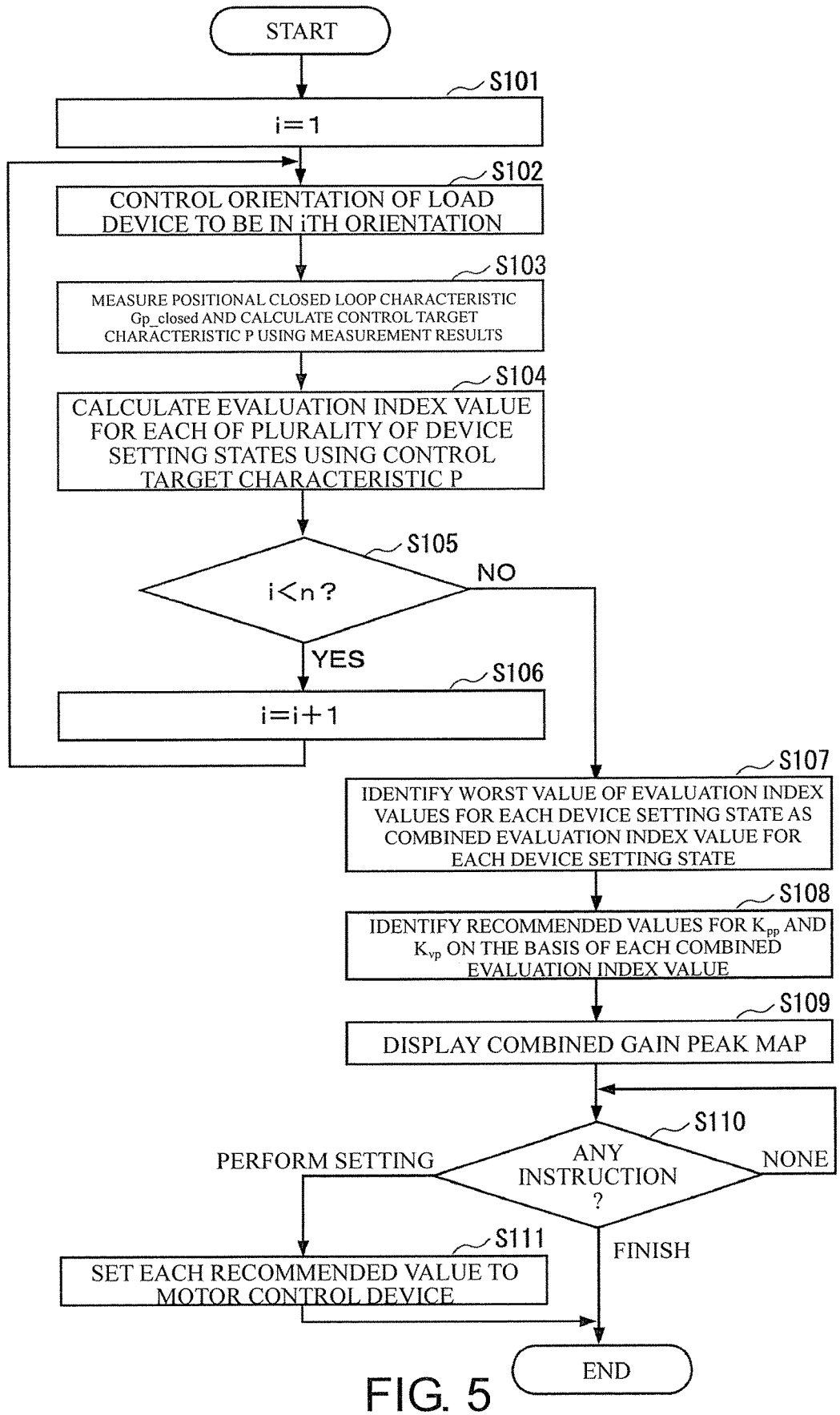
FIG. 5 is a flowchart of first setting support processing.

FIG. 5 illustrates a flowchart of the first setting support processing.

The first setting support processing is processing in which a total number n of orientations (evaluation targets) and information stipulating details of processing to be executed to have the orientation of the load device 42 within a first orientation to an nth orientation can be set as processing conditions. However, when the setting support device 10 cannot control the orientation of the load device 42 (when a user performs work of changing the orientation of the load device 42), setting of information stipulating details of processing is omitted. In addition, in Step S102 of the first setting support processing, instead of the processing which will be described below, processing of standing by for an input of information indicating that orientation work for the load device 42 has been completed is performed.

Specifically, as illustrated in the diagram, first, the computation processing part 14 which has started the first setting support processing sets "1" for a variable i (Step S101). Next, the computation processing part 14 controls the orientation of the load device 42 to be an ith orientation (Step S102). As already described, in a case or the like in which the setting support device 10 cannot control the orientation of the load device 42, in this Step S102, processing of standing by for an input of information indicating that orientation work for the load device 42 has been completed is performed.

When control of the orientation of the load device 42 for the ith orientation is completed, the computation processing part 14 measures the positional closed loop characteristic Gp_closed (arrangement of a complex number) by controlling the motor control device 30 (Step S103). This processing may be "processing in which the detection position is regularly collected while a position command that changes over time to include many frequency components is input to the motor control device 30 and the positional closed loop characteristic Gp_closed is calculated by taking a ratio through Fourier transform of the input position command and the collected detection position" or may be "processing in which the motor control device 30 is requested to measure the positional closed loop characteristic Gp_closed and a measurement result is acquired from the motor control device 30".

Further, using the measurement results, the computation processing part 14 calculates a control target characteristic P (a frequency transfer function P of the control target 40) (Step S103). More specifically, first, the computation processing part 14 identifies a characteristic (a frequency transfer function; the same applies hereinafter) Cp of the position controller 31 and a characteristic Cv of the speed controller 32 from setting values of various parameters ($K_{pp}$, $K_{vp}$, $K_i$, and filter parameters) at a time point (a measurement time point of Gv_closed) thereof. Further, the computation processing part 14 calculates the control target characteristic P from the identified characteristics Cp and Cv and characteristics Cd and Gv_closed of the speed detector 35 (refer to FIG. 4B).

In Step S104, the computation processing part 14 which has ended the processing of Step S103 calculates an evaluation index value for each of a plurality of device setting states using the control target characteristic P (Step S104). More specifically, for each of the device setting states, the computation processing part 14 repeats "processing in which the characteristics (the characteristic Cp of the position controller 31 and the characteristic Cv of the speed controller 32) of each part in the device setting state are identified; Gp_closed is calculated from the characteristics of each identified part, the characteristic Cd, and the control target characteristic P; and the evaluation index value is calculated from the calculated Gp_closed".

A plurality of control device states denotes states having a mutually different combination of the position proportional gain $K_{pp}$ and the speed proportional gain $K_{vp}$, the integration gain $K_i$ is a value obtained by multiplying the speed proportional gain $K_{vp}$ by ¼, the cut-off frequency of the torque filter is a value obtained by multiplying the speed proportional gain $K_{vp}$ by 6.8, and the filter parameter value of the notch filter is a value at a start time point of the first setting support processing. In addition, the evaluation index value denotes a gain peak value (a peak value of a gain peak) of a positional closed loop. The evaluation index value may be different information (a settling time or the like). However, it is preferable that the evaluation index value be a gain peak value of the positional closed loop or the speed closed loop, or an index value for a stability such as a gain margin or a phase margin of the positional open loop or a speed open loop.

The computation processing part 14 which has ended the processing of Step S104 determines whether or not the value i is smaller than the total number n of the evaluation target orientations (Step S105). Further, when the value i is smaller than n (Step S105; YES), the computation processing part 14 increments the value i by "1" (Step S106) and then executes the processing of Step S102 and thereafter again.

When the value i is not smaller than n (Step S105; NO), the computation processing part 14 identifies the worst value of the evaluation index values for each of the device setting states as a combined evaluation index value for each of the device setting states (Step S107). More specifically, in this Step S107, processing of searching for the worst value of n evaluation index values having different orientations of the load device and storing the searched worst value as the combined evaluation index value is performed for each of the device setting states. This processing of Step S107 may be different processing, for example, processing in which the evaluation index values for various orientations that are not identification targets for the evaluation index value are estimated from a relationship between the orientation and the evaluation index value and an estimated result of the worst evaluation index value is taken as the combined evaluation index value.

The computation processing part 14 which has ended the processing of Step S107 identifies recommended values for the position proportional gain $K_{pp}$ and the speed proportional gain $K_{vp}$ on the basis of the combined evaluation index value identified for each of the device setting states (Step S108). The processing performed in Step S108 by the computation processing part 14 according to the present embodiment is processing of calculating an evaluation value E by the following arithmetic expression for each combination of $K_{pp}$ and $K_{vp}$ having a combined evaluation index value equal to or smaller than a predetermined value (for example, 1 [dB]) and identifying a combination of $K_{pp}$ and $K_{vp}$, with which the largest evaluation value E is calculated, as the recommended values for $K_{pp}$ and $K_{vp}$.

$$E = q_1 K_{pp}^2 + q_2 K_{vp}^2 \qquad \text{[Math. 2]}$$

The factors $q_1$ and $q_2$ are constants set in advance.

In a certain device setting state a, if an evaluation index value when the load device 42 is taking a jth orientation is referred to as an evaluation index value #j, it is possible to state that the combined evaluation index value for the device setting state a is the worst value of the evaluation index values #1 to #n. Further, the evaluation index value (gain peak value) is a value having a positive correlation with the safety. Therefore, even if any of combinations of $K_{pp}$ and $K_{vp}$ in which the combined evaluation index value is equal to or smaller than a predetermined value is set in the motor control device 30, safety can be secured regardless of the orientation of the load device 42. Further, since both the speed proportional gain $K_{vp}$ and the integration gain $K_i$ are values having substantially a positive correlation with a track following performance, if a combination having $K_{pp}$ and $K_{vp}$ as the evaluation value E is searched for under a condition that the combined evaluation index value is a predetermined value, a stability can be ensured regardless of the orientation of the load device 42, and it is possible to identify a combination of $K_{pp}$ and $K_{vp}$ (that is, recommended values for $K_{pp}$ and $K_{vp}$) with which the maximum performance of the motor control device 30 can be brought out.

The computation processing part 14 which has ended the processing of Step S108 displays a combined gain peak map on the screen of the display device 12 utilizing the display control part 16 (Step S109).

Figure 6:
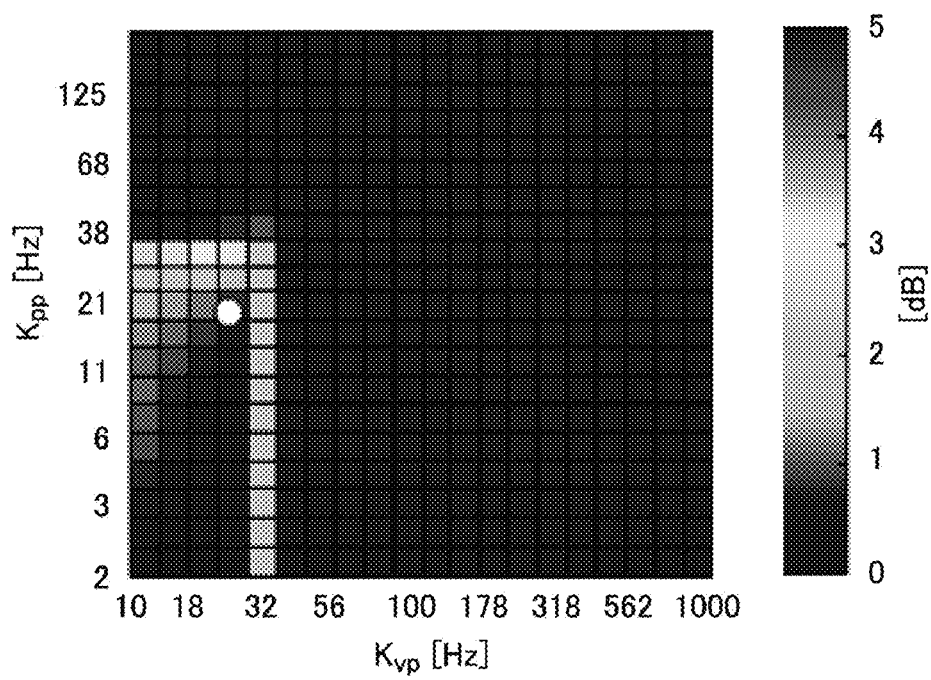
FIG. 6 is a view describing a combined gain peak map.

FIG. 6 illustrates an example of a combined gain peak map. As illustrated in the diagram, basically, in the combined gain peak map, a symbol (o) indicating a recommended value is marked on a contour diagram having colored stability index values with respect to each combination of a value of the speed proportional gain $K_{vp}$ and the position proportional gain $K_{pp}$.

The computation processing part 14 which has ended the processing of Step S109 stands by for (monitors) an input of an ending instruction or a setting instruction (Step S110; none). Further, when a setting instruction is input (Step S110; setting), the computation processing part 14 sets each recommended value (and a value calculated from each recommended value) in the motor control device 30 (Step S111), and then this first setting support processing ends. In addition, when an ending instruction is input (Step S110; ending), the computation processing part 14 ends this first setting support processing without changing each control parameter value of the motor control device 30.

<<Second Setting Support Processing>>

Hereinafter, using FIG. 5 that is a flowchart of the first setting support processing, details of the second setting support processing will be described focusing on differences between the first setting support processing and the second setting support processing.

Essentially, the second setting support processing is processing having the same details as the first setting support processing. However, the second setting support processing is processing capable of designating a plurality of control target states (a parameter for a setting target control parameter, variation of the setting target control parameter, whether or not to associate parameters other than the setting target control parameter with the setting target control parameter value, and the like). In addition, the second setting support processing can also designate the number and the kind of evaluation target values to be calculated, and in Step S104 of the second setting support processing, the kind and the number of evaluation index values designated by a user are calculated for each of the plurality of control target states designated by the user.

Specifically, for example, when a user designates the settling time as the evaluation index value and designates a control parameter A as the setting target control parameter, in Step S104, the settling time is calculated for each orientation and each control device state. Further, when a corresponding relationship between the settling time and the control device state (control parameter A value) is obtained for each of the first to third orientations (n=3) as illustrated in (A), (B), and (C) of FIG. 7, in Step S107, the worst value of the settling time in the first orientation to the third orientation is obtained for each value of the control parameter A and is adopted as the combined evaluation index value.

Figure 7:
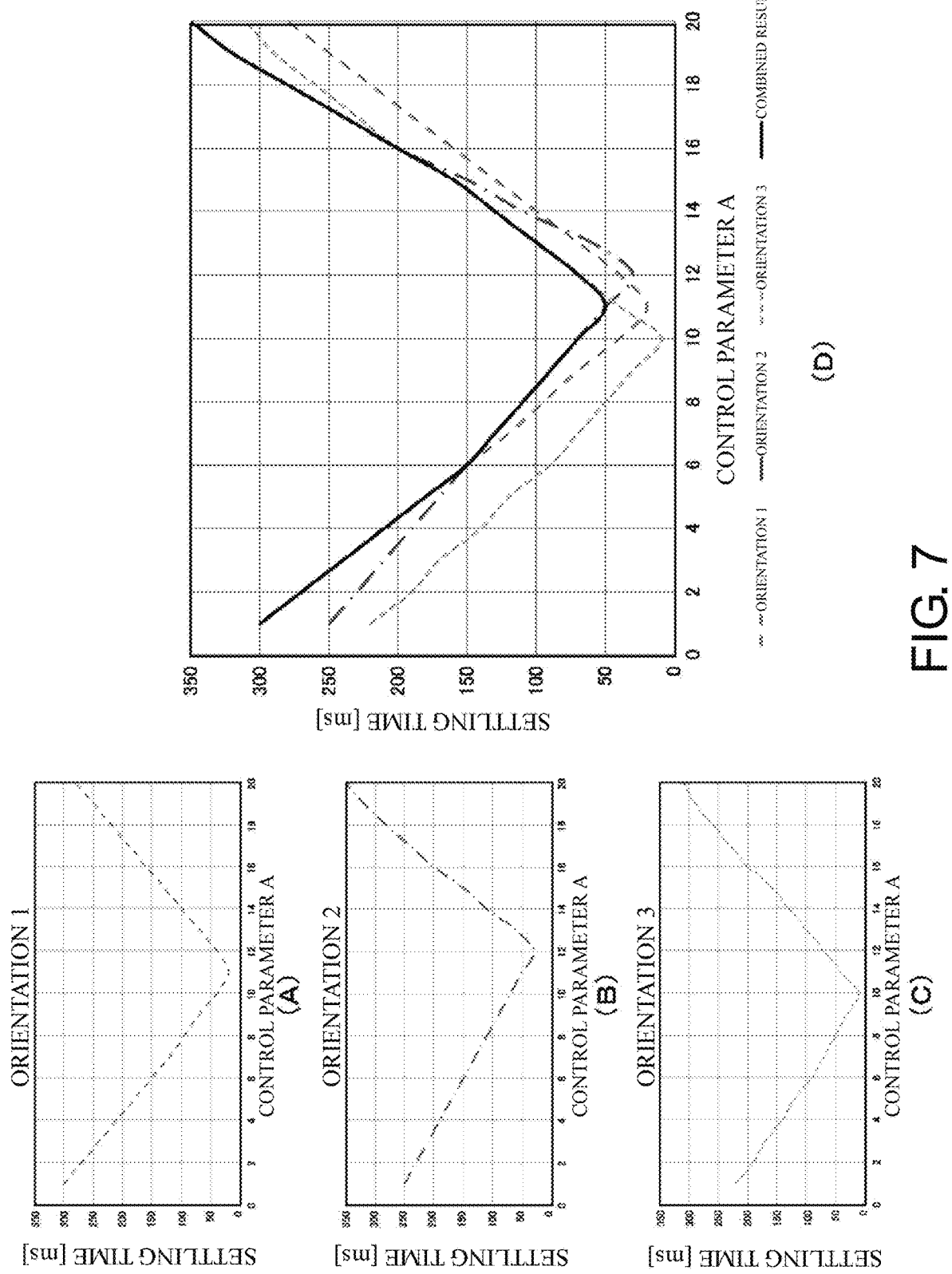
FIG. 7 is a view describing information displayed as a processing result in second setting support processing.

In addition, in the second setting support processing, the processing of Step S108 is omitted, and in Step S109, on the screen of the display device 12, a graph as illustrated in (D) of FIG. 7, that is, a graph apparently showing that an optimum value for the control parameter A is 11 is displayed. The dotted lines, the single dot dashed lines, and the broken lines indicated in this graph are lines which are not actually displayed.

In Step S110 of the second setting support processing in which only one value is designated as the evaluation index value, an operation of designating one point on the graph using a mouse or the like and an operation of a predetermined ending instruction are monitored. Further, when the former operation is performed, a value corresponding to the X coordinate of the designated point is set as the value of the control parameter A in the motor control device 30, and then the second setting support processing ends. In addition, when an operation of an ending instruction is performed, the second setting support processing simply ends.

Figure 8:
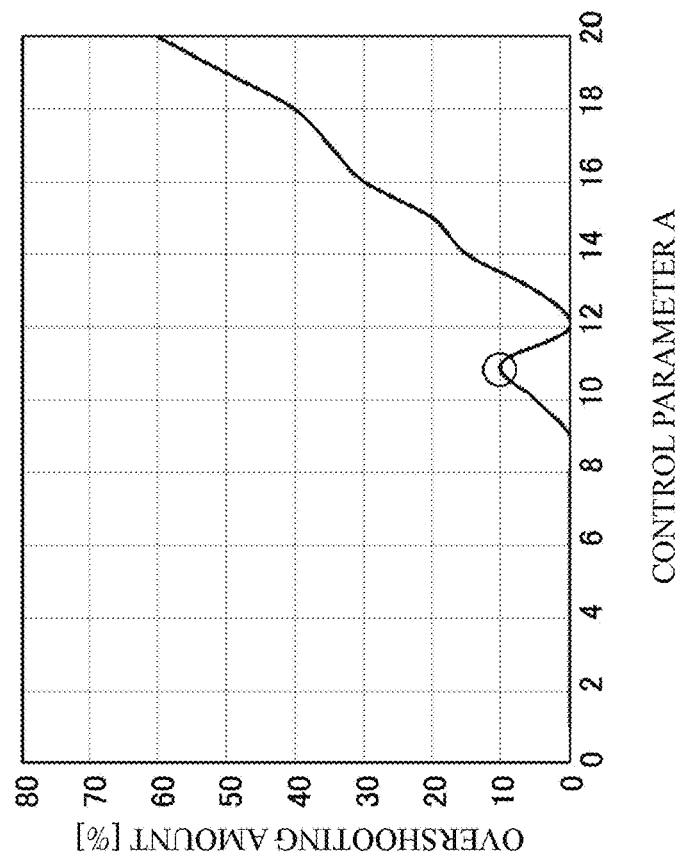
FIG. 8 is another view describing information displayed as a processing result in the second setting support processing.
Figure 8:
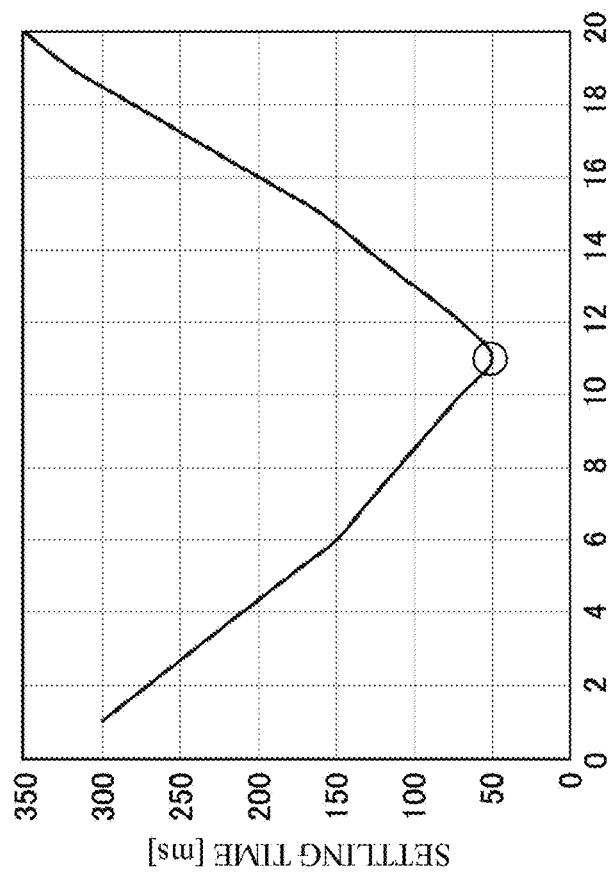

Regarding the evaluation index value, when values of a plurality of kinds, for example, the settling time and an overshooting amount are designated, in Step S104, the settling time and the overshooting amount are calculated. Further, in Step S109, as illustrated in FIG. 8, a graph for the settling time (combined settling time) and a graph for the overshooting amount (combined overshooting amount) are displayed on the screen of the display device 12. The symbol "o" on each graph indicates a pointer which operates in association with the curve within each graph. A user can easily understand the overshooting amount and the settling time when a certain value is set as the control parameter A value from the position of the pointer in the Y direction (height) on each graph.

In Step S110 of the second setting support processing in which two values are designated as the evaluation index value, an operation of designating one point on the graph using a mouse or the like and an operation of a predetermined ending instruction are monitored. Further, when the former operation is performed, a value corresponding to the X coordinate of the designated point is set as the value of the control parameter A in the motor control device 30, and then the second setting support processing ends. In addition, when an operation of an ending instruction is performed, the second setting support processing simply ends.

In addition, the second setting support processing is processing in which some evaluation index values can be calculated under the current parameter settings without any change.

When a user has instructed to evaluate the peak value of the gain peak such as the settling time and the positional closed loop under the current parameter settings without any change, in Step S104, the settling time and the peak value of the gain peak are calculated as the evaluation index value under the current parameter settings without any change.

Further, instead of the processing of Steps S108 and S109, processing of displaying the combined evaluation index value for the settling time and the peak value of the gain peak on the screen of a display is performed, and in Step S110, processing of monitoring only an input of an ending instruction is performed.

Figure 9:
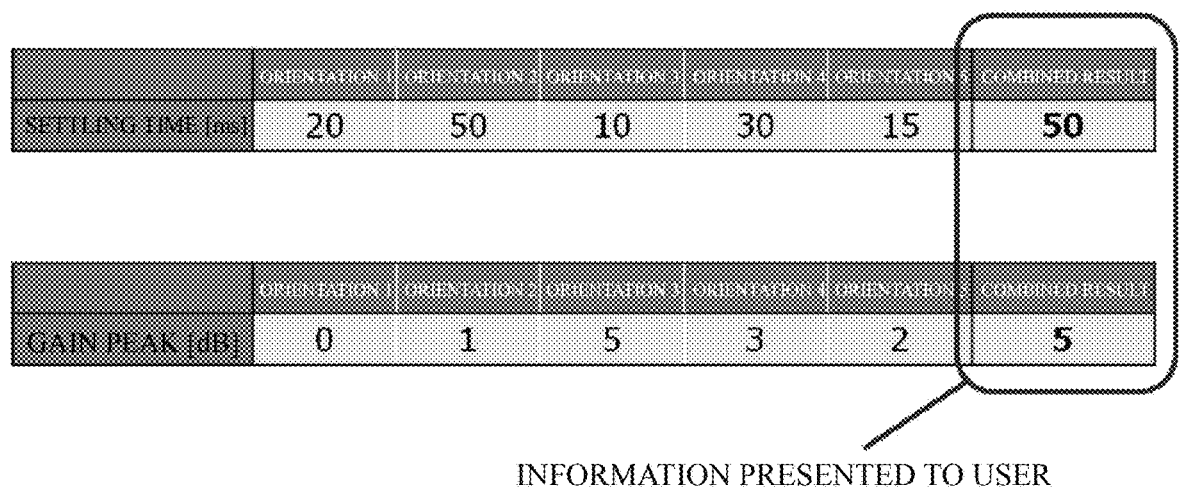
FIG. 9 is another view describing information displayed as a processing result in the second setting support processing.

When a user has instructed to evaluate the settling time and the peak value of the gain peak under the current parameter settings without any change, as illustrated in FIG. 9, the settling time and the peak value of the gain peak are calculated for each orientation, and the combined evaluation index value for each index value is also calculated. However, only the combined evaluation index value is presented to a user. Therefore, a user can judge whether or not the current settings are reasonable without struggling in finding which information is information to be focused on.

<<Notch Parameter Setting Support Processing>>

Figure 10:
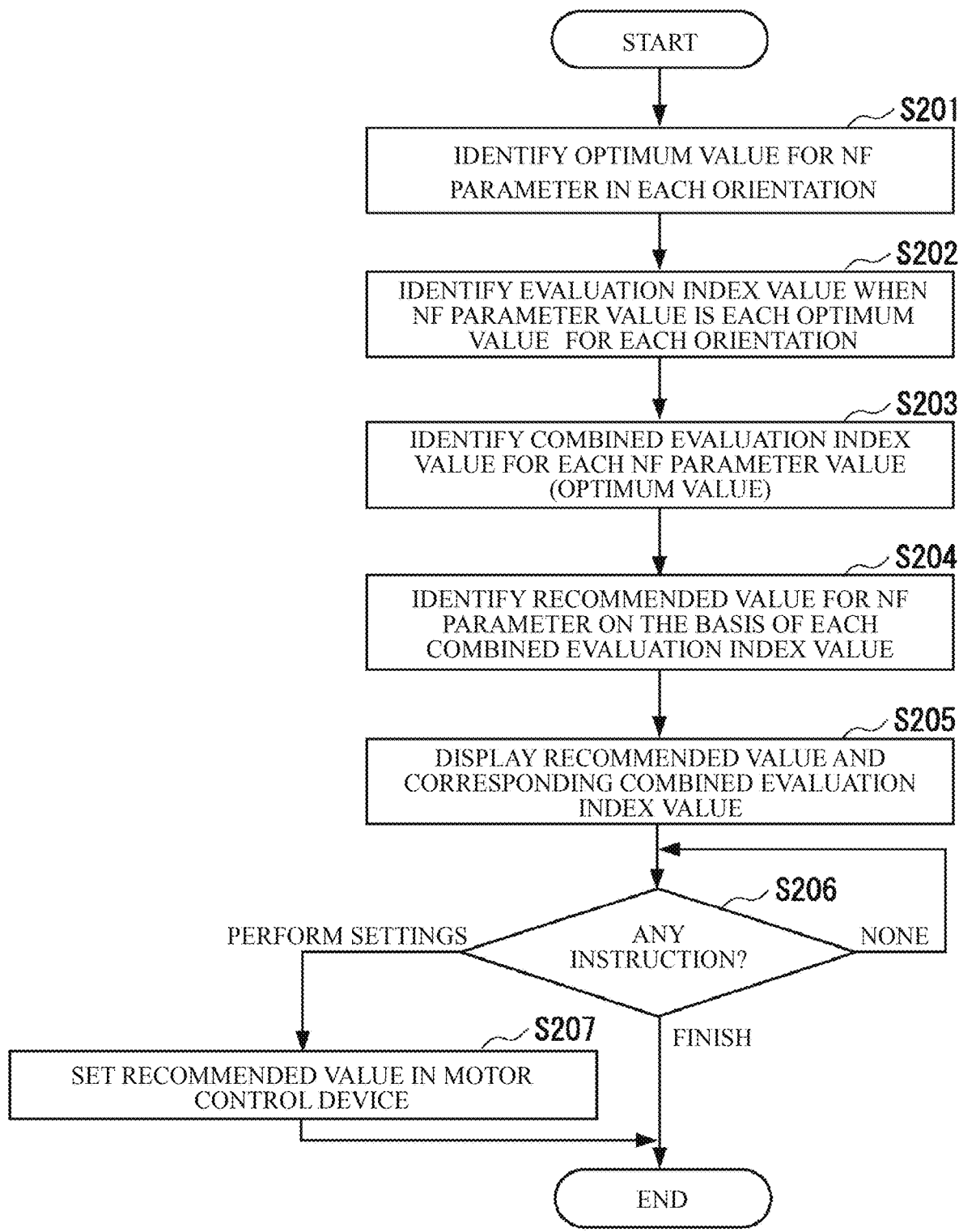
FIG. 10 is a flowchart of notch parameter setting support processing.

FIG. 10 illustrates a flowchart of the notch parameter setting support processing.

As illustrated in the diagram, first, the computation processing part 14 which has started this notch parameter setting support processing identifies optimum values for the filter parameters (the center frequency, the notch depth, and the Q value, hereinafter, NF parameters) of the notch filter in the orientation thereof for each of various orientations of the load device 42 (Step S201). This processing of Step S201 is processing in which the positional closed loop characteristic Gp_closed is measured and the foregoing optimum values are identified from the position and the shape of the resonant peak of the measurement results.

Next, the computation processing part 14 calculates the evaluation index value (in the present embodiment, the gain peak value of the positional closed loop) when the NF parameter value is each of the identified optimum values for each orientation in which the optimum value is identified (Step S202). In addition, the computation processing part 14 identifies the combined evaluation index value for each of the NF parameter values (each of the identified optimum values) (Step S203).

Thereafter, the computation processing part 14 searches for the best combined evaluation index value from the identified combined evaluation index values and identifies the NF parameter value in which the searched combined evaluation index value (hereinafter, the corresponding combined evaluation index value) is identified as the recommended value for the NF parameter (Step S204).

In subsequent Step S205, the computation processing part 14 displays the identified recommended value and the foregoing combined evaluation index value on the screen of the display device 12. Thereafter, the computation processing part 14 stands by for (monitors) an input of an ending instruction or a setting instruction (Step S206; none). Further, when a setting instruction is input (Step S206; setting), the computation processing part 14 sets the recommended value in the motor control device 30 (Step S207), and then this notch parameter setting support processing ends. In addition, when an ending instruction is input (Step S206; ending), the computation processing part 14 ends the notch parameter setting support processing without changing each parameter value of the notch filter.

As described above, the setting support device 10 according to the present embodiment can display the combined evaluation index value, which is the worst value of the evaluation index values when the load device 42 is in various orientations or the load device 42 is in various situations, on the screen of the display device 12 in various forms (FIG. 6, (D) of FIG. 7, FIG. 8, and FIG. 9). For this reason, a user of the setting support device 10 can understand whether the current control parameter value of the motor control device 30 is reasonable (causing no problem in all the orientations of the load device 42) or a favorable value for the control parameter value simply by looking at the combined evaluation index value. In addition, the setting support device 10 also has a function of calculating the recommended value and setting it in the motor control device 30. Therefore, according to the setting support device 10, it is possible to reduce a time needed for setting a parameter value in the motor control device 30 that controls the motor 41 that drives the load device 42 in which the mechanical parameters vary depending on an orientation or a situation.

In addition, the setting support device 10 also has a function of identifying an NF parameter value with which the combined evaluation index value becomes the best and outputting it as a recommended value (FIG. 10). If the combined evaluation index value becomes the best, a region (parameter value range) in which a stability (control performance when the evaluation index value is an index value for control performance) can be secured expands. Therefore, if the first setting support processing is executed after utilizing the functions, a control parameter value which can draw out substantially the maximum performance can be set in the motor control device 30.

<<Modification Form>>

The setting support device 10 can be subjected to various modifications. For example, the setting support device 10 can be modified into a device calculating each evaluation index value from an actual measurement result of the positional closed loop characteristics. In addition, a function of identifying recommended values for $K_{pp}$ and $K_{vp}$ may be applied to the notch parameter setting support processing. In addition, the first setting support processing (FIG. 5) may be modified into processing in which an index value related to control performance is also calculated in Step S104 and recommended values for $K_{pp}$ and $K_{vp}$ are identified on the basis of the index value related to control performance in Step S108.

In addition, the setting support device 10 may be modified into a device that presents an evaluation index value itself identified for a load device state to a user without obtaining a combined evaluation index value, that is, a device that displays (for example, tab display) a graph as illustrated in (A) to (C) of FIG. 7 instead of a graph as illustrated in (D) of FIG. 7 on the screen of the display device 12. However, when the setting support device 10 is modified into such a device, there is a need for a user to compare a plurality of evaluation index values. Therefore, as in the foregoing embodiment, it is preferable to obtain the combined evaluation index value.

<<Appendix>>

Provided is a setting support device (10) supporting setting of a control parameter in a motor control device (30) that controls a motor (41) that drives a load device (42) in which mechanical parameters vary depending on an orientation or a situation. The setting support device (10) includes a first identification means (14) that identifies an evaluation index value indicating a stability or control performance of motor control by the motor control device (30) in each of a plurality of load device states in which the load device (42) is in mutually different orientations, a second identification means (14) that identifies a combined evaluation index value representative of the evaluation index values for the plurality of load device states on the basis of the evaluation index values for the plurality of load device states calculated by the first identification means (14), and a display control means (14 or 16) that displays the combined evaluation index value identified by the second identification means (14) on a screen of a display (12).

Provided is a setting support device (10) supporting setting of a control parameter in a motor control device (30) that controls a motor (41) that drives a load device (42) in which mechanical parameters vary depending on an orientation or a situation. The setting support device (10) includes an identification means (14) that identifies an evaluation index value indicating a stability or control performance of motor control by the motor control device (30) in each of a plurality of load device states in which the load device (42) is in mutually different orientations, and a display control means (14 or 16) that displays information indicating the evaluation index value for the plurality of load device states calculated by the identification means (14) on a screen of a display (12).

REFERENCE SIGNS LIST

10 Setting support device
11 Input device
12 Display device
13 Main body portion
14 Computation processing part
15 UI part 16 Display control part
30 Motor control device
31 Position controller
32 Speed controller
34 Current controller
35 Position detector
40 Control target
41 Motor
42 Load device

What is claimed is:

1. A setting support device comprising:
a processor, configured to:
set a first set of control parameters configured to control a motor that drives a load device situated in a first orientation of a plurality of orientations, wherein the first set of control parameters comprises a first positional proportional gain and a first speed proportional gain;
calculate a first evaluation index value corresponding to the orientation from a first frequency response of the motor situated in the first orientation, wherein the first evaluation index value comprises a first gain peak value calculated based on the first positional proportional gain and the first speed proportional gain;
set a second set of control parameters configured to control the motor that drives the load device situated in a second orientation of the plurality of orientations, wherein the second first set of control parameters comprises a second positional proportional gain and a second speed proportional gain;
calculate a second evaluation index value corresponding to the second orientation from a second frequency response of the motor situated in the second orientation, wherein the second evaluation index value comprises a second gain peak value calculated based on the second positional proportional gain and the second speed proportional gain;
determine a combined evaluation index from an evaluation which takes evaluation index values corresponding to all of the plurality of orientations of the load device into account, the evaluation index values comprise the first evaluation index value and the second evaluation index value, and a third evaluation index value, wherein the combined evaluation index value is determined as a highest value among all of the evaluation index values corresponding to all of the plurality of orientations of the load device; and
identify a recommended positional proportional gain and a recommended speed proportional gain corresponding to the combined evaluation index which has been determined so as to set the recommended positional proportional gain and the recommended speed proportional gain to control the motor that drives the load regardless of orientation of the load device.

2. The setting support device according to claim 1, wherein the highest value is a worst performance value of the evaluation index values among the plurality of orientations of the load device as the combined evaluation index value.

3. The setting support device according to claim 1, wherein the processor is configured to display a graph illustrating a relationship between a value of the one of the first set of control parameters in each control device state and the combined evaluation index value for each control device state on the screen of the display.

4. The setting support device according to claim 1, wherein the first evaluation index value and the second evaluation index value indicate a stability or control performance of motor control by the controller in each of the plurality of load device states in which the load device is in mutually different orientations.

5. The setting support device according to claim 1, wherein the processor is configured to:
calculate the first evaluation value E by the following calculation expression of Math. 1, wherein $K_{pp}$ is the position proportional gain, $K_{vp}$ is the speed proportional gain, and $q_1$ and $q_2$ are constants, $$E = q_1 K_{pp}^2 + q_2 K_{vp}^2 \qquad [\text{Math. 1}].$$

6. The setting support device according to claim 1, wherein the first gain peak value and the second gain peak value are determined from a positional closed loop or a speed closed loop.

7. The setting support device according to claim 1, wherein the second evaluation index value is a gain margin or a phase margin of a positional open loop or a speed open loop.

8. The setting support device according to claim 1, wherein the processor is further configured to:
identify an optimum value for a parameter of a notch filter inside the controller in each of the plurality of load device states; identify, for each of the plurality of load device states, the third evaluation index value indicating a stability or control performance of motor control by the controller when a parameter value of the notch filter is the optimum value in each load device state; identifies, for each of the optimum values, another combined evaluation index value representative of the third evaluation index values in which the optimum value is identified as a value of the parameter of the notch filter; and identify and output a recommended value for the parameter of the notch filter on the basis of the another combined evaluation index value identified for each of the optimum values.

9. A setting support method implemented by a processor comprising: comprising:
setting a first set of control parameters configured to control a motor that drives a load device situated in a first orientation of a plurality of orientations, wherein the first set of control parameters comprises a first positional proportional gain and a first speed proportional gain;
calculating a first evaluation index value corresponding to the orientation from a first frequency response of the motor situated in the first orientation, wherein the first evaluation index value comprises a first gain peak value calculated based on the first positional proportional gain and the first speed proportional gain;
setting a second set of control parameters configured to control the motor that drives the load device situated in a second orientation of the plurality of orientations, wherein the second first set of control parameters comprises a second positional proportional gain and a second speed proportional gain;
calculating a second evaluation index value corresponding to the second orientation from a second frequency response of the motor situated in the second orientation, wherein the second evaluation index value comprises a second gain peak value calculated based on the second positional proportional gain and the second speed proportional gain;
determining a combined evaluation index from an evaluation which takes evaluation index values corresponding to all of the plurality of orientations of the load device into account, the evaluation index values comprise the first evaluation index value and the second evaluation index value, and a third evaluation index value, wherein the combined evaluation index value is determined as a highest value among all of the evaluation index values corresponding to all of the plurality of orientations of the load device; and identifying a recommended positional proportional gain and a recommended speed proportional gain corresponding to the combined evaluation index which has been determined so as to set the recommended positional proportional gain and the recommended speed proportional gain to control the motor that drives the load regardless of orientation of the load device.

10. The setting support device of claim 1, wherein the first evaluation index value further comprises a settling time or an overshooting amount.

* * * * *